US012540146B2

(12) United States Patent
Droege et al.

(10) Patent No.: US 12,540,146 B2
(45) Date of Patent: Feb. 3, 2026

(54) PROCESS FOR THE PRODUCTION OF SULFUR CONTAINING SILANES BY UTILIZATION OF PHASE TRANSFER CATALYSIS

(71) Applicant: Evonik Operations GmbH, Essen (DE)

(72) Inventors: Helmut Droege, Bornheim (DE); Julia Hermeke, Gerlingen (DE); Elisabeth Bauer, Kleines Wiesental (DE)

(73) Assignee: Evonik Operations GmbH, Essen (DE)

( * ) Notice: Subject to any disclaimer, the term of this patent is extended or adjusted under 35 U.S.C. 154(b) by 717 days.

(21) Appl. No.: 17/760,115

(22) PCT Filed: Jan. 25, 2021

(86) PCT No.: PCT/EP2021/051582
§ 371 (c)(1),
(2) Date: Aug. 4, 2022

(87) PCT Pub. No.: WO2021/156085
PCT Pub. Date: Aug. 12, 2021

(65) Prior Publication Data
US 2023/0037594 A1    Feb. 9, 2023

(30) Foreign Application Priority Data
Feb. 6, 2020   (EP) .................................... 20155923

(51) Int. Cl.
*C07F 7/18* (2006.01)
(52) U.S. Cl.
CPC .................. *C07F 7/1892* (2013.01)
(58) Field of Classification Search
CPC .......................... C07F 7/1804; C07F 7/1892
See application file for complete search history.

(56) References Cited

U.S. PATENT DOCUMENTS 4,129,585 A * 12/1978 Buder ................... C08K 5/548
556/428
5,650,457 A * 7/1997 Scholl ................... C08K 5/548
524/262

(Continued)

FOREIGN PATENT DOCUMENTS

CN    104910202 A  *  9/2015
CN    103787373 B  *  3/2016
CN    109293148 A  *  2/2019 ............... C02F 9/00

OTHER PUBLICATIONS

Tao et al. (CN103787373B English) (Year: 2016).*

(Continued)

*Primary Examiner* — Sally A Merkling
*Assistant Examiner* — Jordan W Taylor
(74) *Attorney, Agent, or Firm* — Oblon, McClelland, Maier & Neustadt, L.L.P.

(57) ABSTRACT

A process for producing sulfur containing silanes may include: (a) preparing an aqueous phase by mixing sodium hydrosulfide or $Na_2S$, sulfur, $Na_2CO_3$ and/or NaOH and brine from recycling (f); (b) adding 20 to 100 wt. % of total phase transfer catalyst; (c) continuously or portion-wise adding halogen alkyl silane, and simultaneously adding the rest of the total phase transfer catalyst, portion-wise or continuously; (d) separating into a lower aqueous suspension and an upper organic phase and drawing off organic phase; (e) supplying the aqueous suspension from (d), separating into a salt cake and brine; (f) recycling all or part of the brine of (e) into (a); (i) routing organic phase of (d) to an evaporation to yield organic residue and low boiling distillate; and (j) separating the organic residue from the evaporation (i) into a sulfur containing silane and a solid residue.

17 Claims, 1 Drawing Sheet

(56) References Cited

U.S. PATENT DOCUMENTS

| | | | | |
|---|---|---|---|---|
| 5,663,396 | A * | 9/1997 | Musleve | C07F 7/1892 |
| | | | | 556/427 |
| 6,384,255 | B1 | 5/2002 | Backer et al. | |
| 6,448,426 | B1 | 9/2002 | Backer et al. | |
| 6,534,668 | B2 | 3/2003 | Backer et al. | |
| 7,371,881 | B2 * | 5/2008 | Frings | C07F 7/1892 |
| | | | | 556/427 |
| 2010/0193732 | A1 * | 8/2010 | Hook | B01J 19/00 |
| | | | | 422/187 |
| 2011/0319646 | A1 * | 12/2011 | Boswell | C07F 7/1804 |
| | | | | 556/428 |
| 2014/0005432 | A1 * | 1/2014 | Droege | C07F 7/1892 |
| | | | | 556/427 |

OTHER PUBLICATIONS

Guo et al. (CN104910202A English) (Year: 2015).*
Liu et al. (CN109293148A English) (Year: 2019).*
International Search Report & Written Opinion issued Apr. 12, 2021 in PCT/EP2021/051582, filed on Jan. 25, 2021, 11 pages.

* cited by examiner

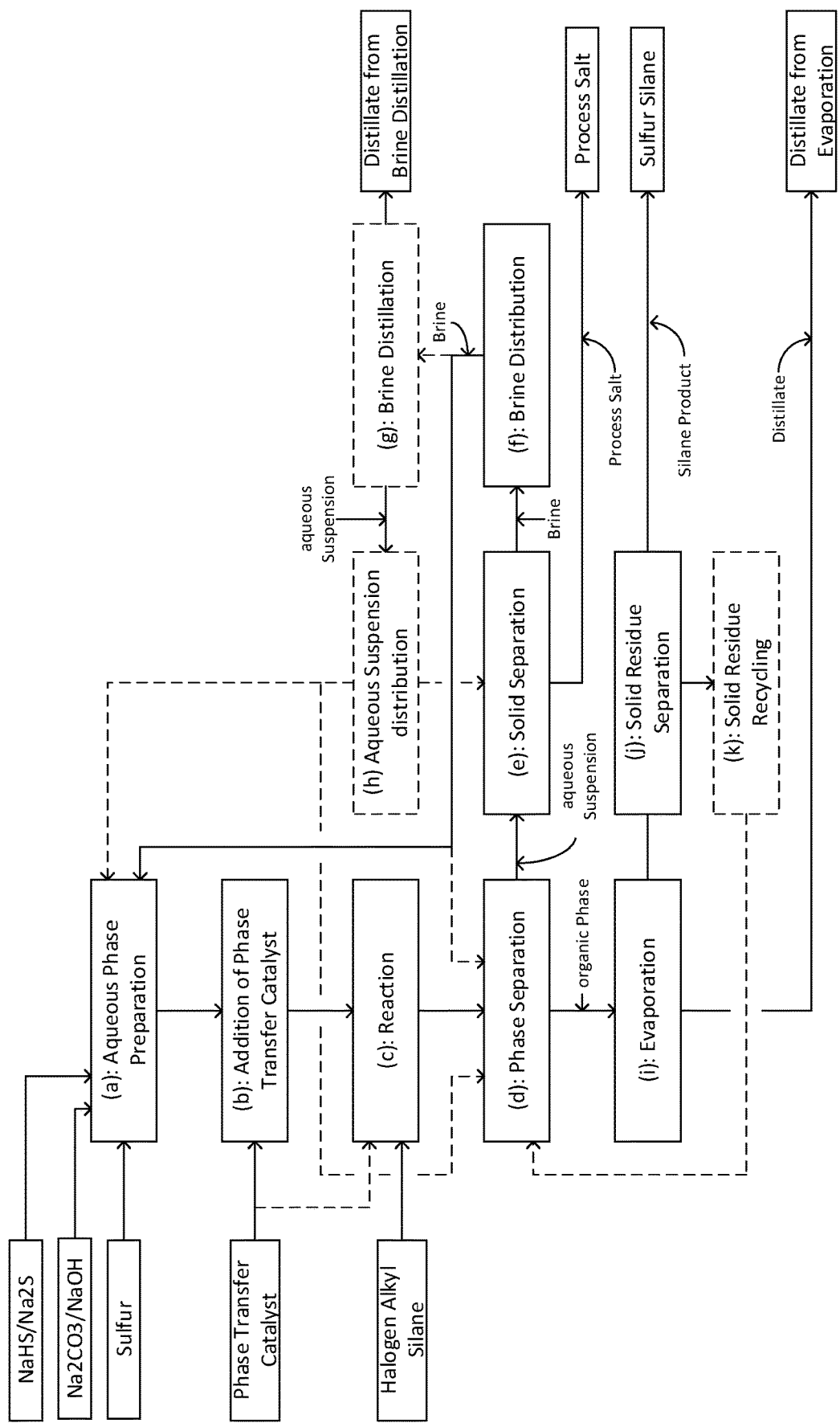

PROCESS FOR THE PRODUCTION OF SULFUR CONTAINING SILANES BY UTILIZATION OF PHASE TRANSFER CATALYSIS

CROSS-REFERENCE TO RELATED APPLICATIONS

The present application is the national stage of international application PCT/EP2021/051582, filed on Jan. 25, 2021, and claims the benefit of the filing date of European Appl. No. 20155923.4, filed on Feb. 6, 2020, the content of each of which is incorporated by reference.

The invention describes a process to generate sulfur containing silanes by utilization of phase transfer catalysis.

One field of process variations to generate sulfur silanes utilizes a phase transfer catalyst to exchange anions between an aqueous phase and an organic phase. The presence of a salt in the reaction is described in U.S. Pat. No. 5,468,893, whereas U.S. Pat. No. 5,663,396 mentions the use of a saturated NaCl-solution in the reaction.

CN103772427 B, CN103788121 A and CN 1038704410 A use NaCl during the formation of the aqueous phase, also use a considerable amount of water, resulting in a non-saturated solution before the addition of chloropropyltriethoxysilane and likely a saturated or near-saturated solution after the reaction with no or little suspended solid content. After the reaction, the reaction mixture undergoes phase separation between the aqueous phase and the organic phase.

CN103787373 B describes the processing of the aqueous phase by oxidation, thermal treatment, filtration and multiple effect evaporation.

In the known processes to generate sulfur silanes using a phase transfer catalyst, the byproduct NaCl is present as saturated or near-saturated aqueous solution. In many parts of the world, environmental restrictions prohibit the discharge of large amounts of NaCl to a public waste water treatment plant or to body of water. This necessitates that the complete aqueous phase is separated into its components by distillation, resulting in a large investment and high consumption of energy.

The phase transfer catalyst is described as being added in one step before the addition of chloropropyltriethoxysilane. Due to the long retention time, this leads to decomposition of part of the catalyst during the reaction and therefore subsequent higher catalyst consumption.

To drive the reaction towards completion in a reasonable time, some raw materials must be added in molar excess to others. This results in a certain amount of one or more unreacted raw materials present in the aqueous phase and destroyed after reaction, resulting in a higher than equivalent raw material usage.

The known processes use pure water in their reaction. This water need to be sourced, evaporated, condensed and treated, adding cost to the process. Further, the addition of water into the reactor results in a bigger than needed reaction volume per unit of product.

Since the aqueous phase of the reaction is not recycled into subsequent batches, sulfides left over from the reaction need to be detoxified, leading to the consumption of considerable amounts of treatment chemicals and considerable amounts of sulfates in the waste salt.

The object of the present invention is to provide a process, which does not use any pure water during the preparation of the aqueous phase. This results in considerably less water consumption and to a fraction of costs for equipment and energy to desalinate water by distillation and to treat distillate in a biological treatment plant.

The subject of the present invention is a process for the production of sulfur containing silanes by the following steps
  (a) preparing an aqueous phase preparation by mixing sodium hydrosulfide or sodium sulfide, sulfur, $Na_2CO_3$ and/or NaOH and a brine of step (f) and optionally of aqueous suspension of step (h),
  (b) adding 20-100 wt.-% of the total amount of phase transfer catalyst
  (c) continuously or in portions adding halogen alkyl silane,
  and simultaneously adding the rest of the total amount of phase transfer catalyst, in portions or continuously, preferably continuously,
  (d) optionally adding brine from (f),
  optionally adding aqueous suspension from (h),
  optionally adding solid residue from step (k),
  separate the phase into a lower aqueous suspension and an upper organic phase and draw off the organic phase,
  (e) supply of the aqueous suspension from (d),
  optionally adding aqueous suspension from (h),
  separate in a salt cake and brine,
  (f) recycle all or a part of the brine of step (e) into step (a) and optional into step (d),
  (g) optionally distillate the rest of the brine from step (e) to yield aqueous distillate and aqueous suspension,
  (h) optionally recycle the aqueous suspension of step (g) into step (a) and/or (d) and/or (e),
  (i) route the organic phase of step (d) to an evaporation step to yield a organic residue and low boiling distillate,
  (j) separate the organic residue from the evaporation step (i) into a sulfur containing silane and a solid residue,
  (k) optionally the solid residue of step (j) is recycled to step (d).

The distillates of steps (g) and/or (i) can be detoxified. Any sulfides present in the distillates from process steps (g) and (i) can be detoxified by the addition of adequate amounts of hydrogen peroxide and sodium hydroxide.

The sulfur containing silanes could be polysulfansilanes of the formula I

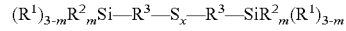

$$(R^1)_{3-m}R^2_mSi\text{—}R^3\text{—}S_x\text{—}R^3\text{—}SiR^2_m(R^1)_{3-m} \quad \text{I}$$

wherein $R^1$ are identical or different and are C1-C10-alkoxygroups, preferably ethoxy, phenoxygroups or alkylpolyethergroups —O—(R'—O)$_r$R'' with R' are identical or different and are a branched or unbranched, saturated or unsaturated, aliphatic, aromatic or mixed aliphatic/aromatic divalent C1-C30 hydrocarbon groups, preferably $CH_2CH_2$, r is an integer from 1 to 30 and R'' unsubstituted oder substituted, branched or unbranched monovalent alkyl-, preferably unsubstituted C8-C15 alkyl, alkenyl-, aryl- or aralkylgroup, $R^2$ are identical or different and are C6-C20-arylgroups, C1-C10-alkylgroups, C2-C20-alkenylgroups, C7-C20-aralkylgroups or halogen,
  $R^3$ are identical or different and are a branched or unbranched, saturated or unsaturated, aliphatic, aromatic or mixed aliphatic/aromatic divalent C1-C30-hydrocarbon groups,
  and m are identical or different and 0, 1, 2 or 3, preferably 0, x is 2-10, preferably 2-4.

Step (a)

The purpose of this process step is the preparation of the aqueous reagent necessary.

The sodium hydrosulfide in step (a) could be an aqueous solution or in hydrate form.

The sodium sulfide in step (a) could be an aqueous solution or in hydrate form.

Sodium hydrosulfide, sulfur and the bases $Na_2CO_3$ and/or NaOH can react to form sodium polysulfide according to the following equation:

$$Na_2CO_3 + NaSH \xrightarrow[H_2O]{} Na_2S + NaHCO_3 \xrightarrow[H_2O]{1/8\, n\, S_8} Na_2S_{n+1} + NaHCO_3 \quad (Ia)$$

$$NaOH + NaSH \xrightarrow[H_2O]{} Na_2S + H_2O \xrightarrow[H_2O]{1/8\, n\, S_8} Na_2S_{n+1} + H_2O \quad (Ib)$$

Aqueous sodium hydrosulfide solution could be a solution of 30 to 50 wt.-%, preferably 39 to 43 wt.-%, of sodium hydrosulfide in water.

The brine from step (f) to be added to step (a) could contain a saturated aqueous solution of process salts and phase transfer catalyst.

The aqueous suspension of step (h) to be added optionally to step (a) could contain a saturated aqueous solution of process salts and phase transfer catalyst and solid process salts and solid phase transfer catalyst.

The mixing step (a) could be done at a temperature of 23 to 90° C., preferably at 70 to 85° C.

Step (b)

The phase transfer catalyst could be solid or a 20-80 wt.-%, preferably 40-60 wt.-%, more preferably 50 wt.-%, aqueous solution.

The phase transfer catalyst could be tetraalkylammonium halogenid of the general formula

[(Alk)$_4$N]$^+$Hal$^-$ where the Alk can be similar or different C2 to C10 hydrocarbon, preferably $C_3$ to $C_5$ hydrocarbon, and the Hal can be chloride, iodide or bromide, preferably bromide.

The phase transfer catalyst could be preferably tetrabutylammonium bromide.

In step (b) 20-100 wt.-%., preferably 30 to 80 wt.-%, most preferably 40 to 60 wt.-%, of the total amount of the phase transfer catalyst could be added.

Step (c)

The step (c) could be done at a temperature of 40 to 100° C., preferably 70 to 85° C.

In step (c) the halogenalkylsilane could react with $Na_2S_{n+1}$.

The halogenalkylsilane could be $(R^1)_{3-m}R^2{}_m Si—R^3—$Hal, with $R^1$, $R^2$, $R^3$ and m as mentioned above and Hal is a halogen, preferably chlorine.

The halogenalkylsilane could be
3-chlorobutyl(triethoxysilane), 3-chlorobutyl(trimethoxysilane), 3-chlorobutyl(diethoxymethoxysilane), 3-chloropropyl(triethoxysilane), 3-chloropropyl(trimethoxysilane), 3-chloropropyl(diethoxymethoxysilane), 2-chloroethyl(triethoxysilane), 2-chloroethyl(trimethoxysilane), 2-chloroethyl(diethoxymethoxysilane), 1-chloromethyl(triethoxysilane), 1-chloromethyl(trimethoxysilane), 1-chloromethyldiethoxymethoxysilane), 3-chloropropyl(diethoxymethylsilane), 3-chloropropyl(dimethoxymethylsilane), 2-chloroethyl(diethoxymethylsilane), 2-chloroethyl(dimethoxymethylsilane), 1-chloromethyl(diethoxymethylsilane), 1-chloromethyl(dimethoxymethylsilane), 3-chloropropyl(ethoxydimethylsilane), 3-chloropropyl(methoxydimethylsilane), 2-chloroethyl(ethoxydimethylsilane), 2-chloroethyl(methoxydimethylsilane), 1-chloromethyl(ethoxydimethylsilane), 1-chloromethyl(methoxydimethylsilane), $[(C_9H_{19}O—(CH_2—CH_2O)_2](MeO)_2Si(CH_2)_3Cl$,
$[(C_9H_{19}O—(CH_2—CH_2O)_3](MeO)_2Si(CH_2)_3Cl$,
$[(C_9H_{19}O—(CH_2—CH_2O)_4](MeO)_2Si(CH_2)_3Cl$,
$[(C_9H_{19}O—(CH_2—CH_2O)_5](MeO)_2Si(CH_2)_3Cl$,
$[(C_9H_{19}O—(CH_2—CH_2O)_6](MeO)_2Si(CH_2)_3Cl$,
$[(C_{12}H_{25}O—(CH_2—CH_2O)_2](MeO)_2Si(CH_2)_3Cl$,
$[(C_{12}H_{25}O—(CH_2—CH_2O)_3](MeO)_2Si(CH_2)_3Cl$,
$[(C_{12}H_{25}O—(CH_2—CH_2O)_4](MeO)_2Si(CH_2)_3Cl$,
$[(C_{12}H_{25}O—(CH_2—CH_2O)_5](MeO)_2Si(CH_2)_3Cl$,
$[(C_{12}H_{25}O—(CH_2—CH_2O)_6](MeO)_2Si(CH_2)_3Cl$,
$[(C_{13}H_{27}O—(CH_2—CH_2O)_2](MeO)_2Si(CH_2)_3Cl$,
$[(C_{13}H_{27}O—(CH_2—CH_2O)_3](MeO)_2Si(CH_2)_3Cl$,
$[(C_{13}H_{27}O—(CH_2—CH_2O)_4](MeO)_2Si(CH_2)_3Cl$,
$[(C_{13}H_{27}O—(CH_2—CH_2O)_5](MeO)_2Si(CH_2)_3Cl$,
$[(C_{13}H_{27}O—(CH_2—CH_2O)_6](MeO)_2Si(CH_2)_3Cl$,
$[(C_{14}H_{29}O—(CH_2—CH_2O)_2](MeO)_2Si(CH_2)_3Cl$,
$[(C_{14}H_{29}O—(CH_2—CH_2O)_3](MeO)_2Si(CH_2)_3Cl$,
$[(C_{14}H_{29}O—(CH_2—CH_2O)_4](MeO)_2Si(CH_2)_3Cl$,
$[(C_{14}H_{29}O—(CH_2—CH_2O)_5](MeO)_2Si(CH_2)_3Cl$,
$[(C_{14}H_{29}O—(CH_2—CH_2O)_6](MeO)_2Si(CH_2)_3Cl$,
$[(C_9H_{19}O—(CH_2—CH_2O)_2]_2(MeO)Si(CH_2)_3Cl$,
$[(C_9H_{19}O—(CH_2—CH_2O)_3]_2(MeO)Si(CH_2)_3Cl$,
$[(C_9H_{19}O—(CH_2—CH_2O)_4]_2(MeO)Si(CH_2)_3Cl$,
$[(C_9H_{19}O—(CH_2—CH_2O)_5]_2(MeO)Si(CH_2)_3Cl$,
$[(C_9H_{19}O—(CH_2—CH_2O)_6]_2(MeO)Si(CH_2)_3Cl$,
$[(C_{12}H_{25}O—(CH_2—CH_2O)_2]_2(MeO)Si(CH_2)_3Cl$,
$[(C_{12}H_{25}O—(CH_2—CH_2O)_3]_2(MeO)Si(CH_2)_3Cl$,
$[(C_{12}H_{25}O—(CH_2—CH_2O)_4]_2(MeO)Si(CH_2)_3Cl$,
$[(C_{12}H_{25}O—(CH_2—CH_2O)_5]_2(MeO)Si(CH_2)_3Cl$,
$[(C_{12}H_{25}O—(CH_2—CH_2O)_6]_2(MeO)Si(CH_2)_3Cl$,
$[(C_{13}H_{27}O—(CH_2—CH_2O)_2]_2(MeO)Si(CH_2)_3Cl$,
$[(C_{13}H_{27}O—(CH_2—CH_2O)_3]_2(MeO)Si(CH_2)_3Cl$,
$[(C_{13}H_{27}O—(CH_2—CH_2O)_4]_2(MeO)Si(CH_2)_3Cl$,
$[(C_{13}H_{27}O—(CH_2—CH_2O)_5]_2(MeO)Si(CH_2)_3Cl$,
$[(C_{13}H_{27}O—(CH_2—CH_2O)_6]_2(MeO)Si(CH_2)_3Cl$,
$[(C_{14}H_{29}O—(CH_2—CH_2O)_2]_2(MeO)Si(CH_2)_3Cl$,
$[(C_{14}H_{29}O—(CH_2—CH_2O)_3]_2(MeO)Si(CH_2)_3Cl$,
$[(C_{14}H_{29}O—(CH_2—CH_2O)_4]_2(MeO)Si(CH_2)_3Cl$,
$[(C_{14}H_{29}O—(CH_2—CH_2O)_5]_2(MeO)Si(CH_2)_3Cl$,
$[(C_{14}H_{29}O—(CH_2—CH_2O)_6]_2(MeO)Si(CH_2)_3Cl$,
$[(C_9H_{19}O—(CH_2—CH_2O)_2](EtO)_2Si(CH_2)_3Cl$,
$[(C_9H_{19}O—(CH_2—CH_2O)_3](EtO)_2Si(CH_2)_3Cl$,
$[(C_9H_{19}O—(CH_2—CH_2O)_4](EtO)_2Si(CH_2)_3Cl$,
$[(C_9H_{19}O—(CH_2—CH_2O)_5](EtO)_2Si(CH_2)_3Cl$,
$[(C_9H_{19}O—(CH_2—CH_2O)_6](EtO)_2Si(CH_2)_3Cl$,
$[(C_{12}H_{25}O—(CH_2—CH_2O)_2](EtO)_2Si(CH_2)_3Cl$,
$[(C_{12}H_{25}O—(CH_2—CH_2O)_3](EtO)_2Si(CH_2)_3Cl$,
$[(C_{12}H_{25}O—(CH_2—CH_2O)_4](EtO)_2Si(CH_2)_3Cl$,
$[(C_{12}H_{25}O—(CH_2—CH_2O)_5](EtO)_2Si(CH_2)_3Cl$,
$[(C_{12}H_{25}O—(CH_2—CH_2O)_6](EtO)_2Si(CH_2)_3Cl$,
$[(C_{13}H_{27}O—(CH_2—CH_2O)_2](EtO)_2Si(CH_2)_3Cl$,
$[(C_{13}H_{27}O—(CH_2—CH_2O)_3](EtO)_2Si(CH_2)_3Cl$,
$[(C_{13}H_{27}O—(CH_2—CH_2O)_4](EtO)_2Si(CH_2)_3Cl$,
$[(C_{13}H_{27}O—(CH_2—CH_2O)_5](EtO)_2Si(CH_2)_3Cl$,
$[(C_{13}H_{27}O—(CH_2—CH_2O)_6](EtO)_2Si(CH_2)_3Cl$,
$[(C_{14}H_{29}O—(CH_2—CH_2O)_2](EtO)_2Si(CH_2)_3Cl$,
$[(C_{14}H_{29}O—(CH_2—CH_2O)_3](EtO)_2Si(CH_2)_3Cl$,
$[(C_{14}H_{29}O—(CH_2—CH_2O)_4](EtO)_2Si(CH_2)_3Cl$,
$[(C_{14}H_{29}O—(CH_2—CH_2O)_5](EtO)_2Si(CH_2)_3Cl$,
$[(C_{14}H_{29}O—(CH_2—CH_2O)_6](EtO)_2Si(CH_2)_3Cl$,

[(C$_9$H$_{19}$O—(CH$_2$—CH$_2$O)$_2$]$_2$(EtO)Si(CH$_2$)$_3$Cl,
[(C$_9$H$_{19}$O—(CH$_2$—CH$_2$O)$_3$]$_2$(EtO)Si(CH$_2$)$_3$Cl,
[(C$_9$H$_{19}$O—(CH$_2$—CH$_2$O)$_4$]$_2$(EtO)Si(CH$_2$)$_3$Cl,
[(C$_9$H$_{19}$O—(CH$_2$—CH$_2$O)$_5$]$_2$(EtO)Si(CH$_2$)$_3$Cl,
[(C$_9$H$_{19}$O—(CH$_2$—CH$_2$O)$_6$]$_2$(EtO)Si(CH$_2$)$_3$Cl,
[(C$_{12}$H$_{25}$O—(CH$_2$—CH$_2$O)$_2$]$_2$(EtO)Si(CH$_2$)$_3$Cl,
[(C$_{12}$H$_{25}$O—(CH$_2$—CH$_2$O)$_3$]$_2$(EtO)Si(CH$_2$)$_3$Cl,
[(C$_{12}$H$_{25}$O—(CH$_2$—CH$_2$O)$_4$]$_2$(EtO)Si(CH$_2$)$_3$Cl,
[(C$_{12}$H$_{25}$O—(CH$_2$—CH$_2$O)$_5$]$_2$(EtO)Si(CH$_2$)$_3$Cl,
[(C$_{12}$H$_{25}$O—(CH$_2$—CH$_2$O)$_6$]$_2$(EtO)Si(CH$_2$)$_3$Cl,
[(C$_{13}$H$_{27}$O—(CH$_2$—CH$_2$O)$_2$]$_2$(EtO)Si(CH$_2$)$_3$Cl,
[(C$_{13}$H$_{27}$O—(CH$_2$—CH$_2$O)$_3$]$_2$(EtO)Si(CH$_2$)$_3$Cl,
[(C$_{13}$H$_{27}$O—(CH$_2$—CH$_2$O)$_4$]$_2$(EtO)Si(CH$_2$)$_3$Cl,
[(C$_{13}$H$_{27}$O—(CH$_2$—CH$_2$O)$_5$]$_2$(EtO)Si(CH$_2$)$_3$Cl,
[(C$_{13}$H$_{27}$O—(CH$_2$—CH$_2$O)$_6$]$_2$(EtO)Si(CH$_2$)$_3$Cl,
[(C$_{14}$H$_{29}$O—(CH$_2$—CH$_2$O)$_2$]$_2$(EtO)Si(CH$_2$)$_3$Cl,
[(C$_{14}$H$_{29}$O—(CH$_2$—CH$_2$O)$_3$]$_2$(EtO)Si(CH$_2$)$_3$Cl,
[(C$_{14}$H$_{29}$O—(CH$_2$—CH$_2$O)$_4$]$_2$(EtO)Si(CH$_2$)$_3$Cl,
[(C$_{14}$H$_{29}$O—(CH$_2$—CH$_2$O)$_5$]$_2$(EtO)Si(CH$_2$)$_3$Cl,
[(C$_{14}$H$_{29}$O—(CH$_2$—CH$_2$O)$_6$]$_2$(EtO)Si(CH$_2$)$_3$Cl,
[(C$_9$H$_{19}$O—(CH$_2$—CH$_2$O)$_2$]$_3$Si(CH$_2$)$_3$Cl,
[(C$_9$H$_{19}$O—(CH$_2$—CH$_2$O)$_3$]$_3$Si(CH$_2$)$_3$Cl,
[(C$_9$H$_{19}$O—(CH$_2$—CH$_2$O)$_4$]$_3$Si(CH$_2$)$_3$Cl,
[(C$_9$H$_{19}$O—(CH$_2$—CH$_2$O)$_5$]$_3$Si(CH$_2$)$_3$Cl,
[(C$_9$H$_{19}$O—(CH$_2$—CH$_2$O)$_6$]$_3$Si(CH$_2$)$_3$Cl,
[(C$_{12}$H$_{25}$O—(CH$_2$—CH$_2$O)$_2$]$_3$Si(CH$_2$)$_3$Cl,
[(C$_{12}$H$_{25}$O—(CH$_2$—CH$_2$O)$_3$]$_3$Si(CH$_2$)$_3$Cl,
[(C$_{12}$H$_{25}$O—(CH$_2$—CH$_2$O)$_4$]$_3$Si(CH$_2$)$_3$Cl,
[(C$_{12}$H$_{25}$O—(CH$_2$—CH$_2$O)$_5$]$_3$Si(CH$_2$)$_3$Cl,
[(C$_{12}$H$_{25}$O—(CH$_2$—CH$_2$O)$_6$]$_3$Si(CH$_2$)$_3$Cl,
[(C$_{13}$H$_{27}$O—(CH$_2$—CH$_2$O)$_2$]$_3$Si(CH$_2$)$_3$Cl,
[(C$_{13}$H$_{27}$O—(CH$_2$—CH$_2$O)$_3$]$_3$Si(CH$_2$)$_3$Cl,
[(C$_{13}$H$_{27}$O—(CH$_2$—CH$_2$O)$_4$]$_3$Si(CH$_2$)$_3$Cl,
[(C$_{13}$H$_{27}$O—(CH$_2$—CH$_2$O)$_5$]$_3$Si(CH$_2$)$_3$Cl,
[(C$_{13}$H$_{27}$O—(CH$_2$—CH$_2$O)$_6$]$_3$Si(CH$_2$)$_3$Cl,
[(C$_{14}$H$_{29}$O—(CH$_2$—CH$_2$O)$_2$]$_3$Si(CH$_2$)$_3$Cl,
[(C$_{14}$H$_{29}$O—(CH$_2$—CH$_2$O)$_3$]$_3$Si(CH$_2$)$_3$Cl,
[(C$_{14}$H$_{29}$O—(CH$_2$—CH$_2$O)$_4$]$_3$Si(CH$_2$)$_3$Cl,
[(C$_{14}$H$_{29}$O—(CH$_2$—CH$_2$O)$_5$]$_3$Si(CH$_2$)$_3$Cl or
[(C$_{14}$H$_{29}$O—(CH$_2$—CH$_2$O)$_6$]$_3$Si(CH$_2$)$_3$Cl.

In step (c) 0-80 wt.-%., preferably 40 to 60% of the whole amount of the phase transfer catalyst could be added.

Step (d)

The time for the phase separation could be 60 seconds to 24 hours, preferably 20 minutes to 120 minutes.

Before or during the phase separation, an additional amount of brine of step (f) can be added to the phase separator. The brine from step (f) added optionally to step (d) could contain a saturated aqueous solution of process salts and phase transfer catalyst.

Before or during the phase separation, the aqueous suspension from step (h) can be added. The aqueous suspension of step (h) added optionally to step (d) could contain a saturated aqueous solution of process salts and phase transfer catalyst and solid process salts and solid phase transfer catalyst.

Before or during or after the phase separation, the solid residue of step (k) can be added. The solid residue of step (k) added optionally to step (d) could contain solid process salts and solid phase transfer catalyst.

The phase separation can be done using centrifugal or gravitational force. The phase separation can be done in a vessel. The phase separation can be done in a centrifuge.

When using gravitational force for phase separation, the organic phase could be drawn off from a side drain and/or the lower aqueous suspension phase can be drawn off from the bottom. The phase separation can be done in a nutsche filter.

Step (e)

The separation of the aqueous suspension from step (d) into salt cake and brine could be done by sedimentation or filtration. A decanter centrifuge can be used for sedimentation. The filtration can be done in a vacuum filter. The filtration can be done in a pressure filter. The filtration can be done in a nutsche filter. The nutsche filter used in step (d) can be the same as the nutsche filter used in step (e).

The aqueous suspension of step (h) added optionally to step (e) could contain a saturated aqueous solution of process salts and phase transfer catalyst and solid process salts and solid phase transfer catalyst.

Step (f)

5 to 100 wt.-%, preferably 10 to 50 wt.-%, of the brine could be recycled into step (a).

0 to 95 wt. %, preferably 10 to 50 wt. %, of the brine could be recycled into step (d).

Step (g)

The brine of step (e) could be concentrated in a brine distillation, yielding an aqueous distillate and aqueous suspension, containing process salt. The brine distillation can be done in a headed and agitated vessel. The brine distillation can be done in a multiple effect evaporator. The heating of the distillation can be done using indirect firing, steam or inorganic or organic heat transfer fluids. The condensation can be done directly or indirectly, preferably indirectly with cooling water. The heating and condensation of the system can be accomplished using vapor compression. The pressure during the distillation can be between 8 mbar absolute and 3000 mbar absolute, preferably between 30 and 1050 mbar absolute, most preferably between 200 and 500 mbar absolute. The aqueous suspension containing process salts and brine can have a 40 to 73 wt.-%, preferably 50 to 68 wt.-%, water content.

Step (h)

0 to 100 wt.-%, preferably 0 wt.-%, of the aqueous suspension could be recycled into step (a).

0 to 100 wt.-% of the aqueous suspension could be recycled into step (d).

0 to 100 wt.-% of the aqueous suspension could be recycled into step (e).

Step (i)

The evaporation step can be done in a vessel. The evaporation step can be done in a thin film evaporator. The evaporation step can be done in a short pass evaporator. The pressure during the evaporation can be between 5 and 500 mbar absolute, preferably between 10 and 50 mbar absolute.

Step (j)

The salt precipitated in the organic phase during the distillation step (i) can be removed in a product polishing step. The solid precipitates can be removed as solid or suspended in a slurry.

The cleared liquid (product) can pass an optional activated carbon bed and a polishing filter for final clarification. The apparatus for the product polishing can be one or a combination of a filter or centrifuge.

Step (k)

The solid content of the solid residue separated in step (j) and routed back to step (d) can be between 0 and 99 wt.-%, preferably between 10 and 90 wt.-%.

The process can be done continuously or in batches. If different process steps are executed in different pieces of equipment, they can be done simultaneously for successive batches.

The brine of step (f) added in step (a) and/or step (d) can be of any previous batch.

The aqueous suspension of step (h) added in step (a) and/or step (d) and/or step (e) can be of any previous batch.

The solid residue of step (k) added in step (d) can be of any previous batch.

The brine of step (f) added in step (a) and/or step (d) and/or the aqueous suspension of step (h) added in step (a) and/or step (d) an/or step (e) and/or the solid residue of step (k) added in step (d) can be of any previous batch.

In the recycling steps the brine of step (f) can feed into any successive batch.

In the recycling steps the aqueous suspension of step (h) can feed into any successive batch.

In the recycling steps the solid residue of step (k) can feed into any successive batch.

In the recycling steps the brine of step (f) and/or the aqueous suspension of step (h) and/or the solid residue of step (k) can feed into any successive batch.

An exemplary process is shown in FIG. 1.

The stepwise or continuous addition of phase transfer catalyst during the reaction can result in an overall lower retention time of the catalyst and therefore a lower amount of catalyst which is lost by decomposition and enables the reduction of the overall amount of catalyst.

Since the reaction recipe is set up in a way that most of the side products generated precipitate, no/low amount of water is needed during reaction to keep them in solution. Therefore, the reaction apparatus and downstream equipment can be considerable smaller than predicted for the known art, thus reducing the cost of investment.

As mentioned above, unreacted educts in the aqueous phase tend to stay in solution. This results in a salt cake which is free of sulfides. Therefore, the salt generated as a side product does not need to be treated to oxidize the sulfides, resulting in a fraction of cost for equipment and chemicals for detoxification.

The invented process does not use any/or less amount of pure water during the preparation of the aqueous phase. Instead, a portion of the brine from previous batches is used to serve as fluid for also keeping the solid components of the reaction mixture in suspension. Only water brought into the process by raw materials and water generated in the reaction need to be removed. This results in considerable less water consumption and to a fraction of costs for equipment and energy to desalinate water by distillation and to treat distillate in a biological treatment plant.

The solubility of the educts and phase transfer catalyst in aqueous solution are generally better than of the side products. Left over educts added in excess and phase transfer catalyst therefore tend to stay in solution, while the side products tend to make up the filter cake. This brine containing these valuable raw materials is recycled into successive batches. Therefore, the addition of raw materials and phase transfer catalysts per batch can be reduced while maintaining the desired excess of these raw materials.

EXAMPLES

The average sulfur chain length and the S2 to S10 content of the final products were determined according to ASTM D 6844-02 using an Aglient Technologies series 1260 Infinity II HPLC apparatus with the following parameters:

Column: Bakerbond C18 (RP), 5 μm, 4.6×250 mm, Flow Rate 1.50 ml/min, λ=254 nm, Column Temperature 30° C., Mobile phase: Mixture of 200 ml tetrabutylammonium bromide-solution (made from 400 mg tetrabutylammonium bromide in 1 l deionized water), 450 ml ethanol and 1350 ml methanol.

Example 1 (4,4,13,13-tetraethoxy-3,14-dioxa-8,9-dithia-4,13-disilahexadecane) Without Recycling Step (Comparative Example)

Sodium carbonate (94.5 g, 0.89 mol, 1.153 eq.), sodium hydrosulfide hydrate (112.9 g, 0.81 mol, 1.044 eq., 43%) and water (286.0 g, 15.9 mol, 20.6 eq.) were heated to 72° C. The reaction mixture is stirred for 5-10 minutes at 72° C. Subsequently, sulfur (27.5 g, 0.86 mol, 1.112 eq.) is added, while maintaining the temperature between 7° and 75° C. After stirring the reaction mixture for 45 min at 72° C., tetra-n-butylammonium bromide (TBAB, 9.4 g, 15.5 mmol, 0,020 eq., 50% in deionized water) and (3-chloropropyl)triethoxysilane (CPTEO, 372 g, 1.54 mol, 2.00 eq.) were added to the reaction mixture, while maintaining the temperature between 72 and 78° C. The suspension was stirred at 75° C. for 3 hours. The conversion of 3-chloropropyl)triethoxysilane in the organic phase was determined by GC and was found to be 98.6%. Then, water (412.5 g) was added to dissolve all salts and the phases were separated at 75° C. The aqueous phase (0.94 kg) was disposed of. After cooling, the organic phase to room temperature, it underwent removal of light boilers by thin-film evaporation. After filtration, the product was obtained as a clear yellowish liquid with an average sulfur chain length of 2.17 and a concentration of S2 to S10 of 93.32%

Example 2 (4,4,13,13-tetraethoxy-3,14-dioxa-8,9-dithia-4,13-disilahexadecane) With Recycling Step (Inventive Example)

(a) A sodium hydrosulfide solution (102 g, 0.785 mol, 1.00 eq., 43%), Na$_2$CO$_3$ (83.2 g, 0.785 mol, 1.00 eq.), and a brine (f) (containing a saturated aqueous solution of left over reagents, phase transfer catalyst and/or products from one or more previous reaction batches using the same recipe, 291 g) were mixed and stirred at 72° C. for 10 minutes. Subsequently, sulfur (28.0 g, 0.873 mol, 1.112 eq.) was added while maintaining a temperature between 70° C. and 75° C. After stirring the reaction mixture for 45 minutes at 72° C., (b) tetra-n-butylammonium bromide (TBAB, 5.06 g, 7.9 mmol, 0.010 eq., 50% in deionized water) was added.

(c) Then, (3-chloropropyl)triethoxysilane (CPTEO, 378 g, 1.57 mol, 2.00 eq.) are added with a rate of 6.3 g/minute to the reaction mixture, while maintaining the temperature between 72 and 78° C. The suspension was stirred at 75° C. for 3 hours. The conversion of 3-chloropropyl)triethoxysilane in the organic phase was determined by GC and was found to be 98.2%.

(d) After this step, 424 g brine (containing an aqueous solution of left over reagents, phase transfer catalyst, and/or products from one or more previous reaction batches using the same recipe) was added and the phases were separated at 75° C.

(e) Afterwards, aqueous suspension (h) from the brine distillation of a previous batch were added to the aqueous phase of the phase separation step and the mixture was filtered, rendering a salt cake (176 g) and brine (aqueous solution for the next brine-recycling reaction).

(f) The remainder of the brine (839 g) was used in the following batch.

(g) 130 g of this brine were introduced into a rotary evaporator for distillation. Water was partially drawn off at 300 mbar absolute, leaving behind an aqueous suspension (85 g), (h) to be used in the following batch.

(i) After cooling the organic phase to room temperature, it was purified by thin-film evaporation.

(j) After filtration, 350 g of product, 93% yield were obtained as a clear yellowish liquid with an average sulfur chain length of 2.15 and a concentration of S2 to S10 of 95.16%

Example 3 (4,4,15,15-tetraethoxy-3,16-dioxa-8,9,10,11-tetrathia-4,15-disilaoctadecane) Without Recycling Step (Comparative Example)

Sodium hydroxide (40.3 g, 1.01 mol, 0.97 eq.), sodium hydrosulfide hydrate (142.1 g, 1.017 mol, 0.98 eq., 43%) and water (79.2 g, 4.40 mol, 4.24 eq.) were heated to 72° C. The reaction mixture was stirred for 10 minutes at 72° C. Subsequently, sulfur (91.8 g, 2.87 mol, 2.76 eq.) was added in two portions, while maintaining the temperature between 7° and 75° C. After stirring the reaction mixture for 15 min at 72° C., tetra-n-butylammonium bromide (TBAB, 8.7 g, 13.5 mmol, 0.013 eq., 50% in deionized water) and (3-chloropropyl)triethoxysilane (CPTEO 499.7 g, 2.07 mol, 2.00 eq.) are added to the reaction mixture, while maintaining the temperature between 72 and 78° C.

The suspension was stirred at 75° C. for 2 hours. Then, water (321 g) was added to dissolve all salts and the phases were separated at 75° C. The aqueous phase (464 g) was disposed of. After cooling, the organic phase to room temperature, it underwent removal of light boilers by thin-film evaporation. After filtration, the product was obtained as a clear yellowish liquid with an average sulfur chain length of 3.72 and a concentration of S2 to S10 of 93.33%

Example 4 (4,4,15,15-tetraethoxy-3,16-dioxa-8,9,10,11-tetrathia-4,15-disilaoctadecane) With Recycling Step (Inventive Example)

(a) Sodium hydroxide (40.2 g, 1.01 mol, 0.97 eq.), sodium hydrosulfide hydrate (133 g, 1,017 mol, 0.98 eq., 43%) and brine (containing an aqueous solution of left over reagents, phase transfer catalyst, and/or products from one or more previous reaction batches using the same recipe 79.3 g.) were heated to 72° C. The reaction mixture was stirred for 10 minutes at 72° C. Subsequently, sulfur (91.8 g, 2.86 mol, 2.76 eq.) was added in two portions, while maintaining the temperature between 7° and 75° C. After stirring the reaction mixture for 15 minutes at 72° C., (b) tetra-n-butylammonium bromide (TBAB, 6.7 g, 10.4 mmol, 0.010 eq, 50% in deionized water, addition in 4 equal portions)

(c) and (3-chloropropyl)triethoxysilane (CPTEO, 500 g, 2.08 mol, 2.00 eq., addition with a rate of 8.5 g/minute) were added to the reaction mixture, while maintaining the temperature between 72 and 78° C. The suspension was stirred at 75° C. for 2 hours.

(d) Afterwards, brine (containing an aqueous solution of left over reagents, phase transfer catalyst, and/or products from one or more previous reaction batches using the same recipe, 324.6 g) was added and the mixture was allowed to settle into phases which were separated.

(e) The aqueous suspension was filtered, rendering a salt cake and brine (aqueous solution for the next brine-recycling reaction).

(f) The brine was used in the following batch.

(g)-

(h)-

(i) After cooling, the organic phase to room temperature, it underwent removal of light boilers by thin-film evaporation.

(i) After filtration, the product was obtained as a clear yellowish liquid with an average sulfur chain length of 3.71 and a concentration of S2 to S10 of 94.11%

The invention claimed is:

1. A process for producing one or more sulfur-comprising silanes, the process comprising:
   (a) preparing an aqueous phase preparation by mixing sodium hydrosulfide or sodium sulfide, sulfur, $Na_2CO_3$ and/or NaOH, a brine of a recycling (f), and, optionally, an aqueous suspension of a recycling (h);
   (b) adding a phase transfer catalyst in a range of from 20 to 100 wt. % of a total phase transfer catalyst amount;
   (c) continuously or portion-wise adding halogen alkyl silane, and simultaneously adding a remainder of the total amount of phase transfer catalyst, portion-wise or continuously;
   (d) optionally, adding brine from the recycling (f), optionally, adding aqueous suspension from a recycling (h), optionally, adding solid residue from a recycling (k), separating a phase into a lower aqueous suspension and an upper organic phase, and drawing off the upper organic phase;
   (e) supplying the aqueous suspension from the separating (d), optionally, adding an aqueous suspension from the recycling (h), and separating into a salt cake and brine;
   (f) recycling all or a part of the brine of the supplying (e) into the preparing (a) and optionally into the adding (d);
   (g) optionally, distilling a remainder of the brine from the supplying (e) to yield an aqueous distillate and the aqueous suspension;
   (h) optionally, recycling the aqueous suspension from the distilling (g) into the preparing (a) and/or the adding (d) and/or the supplying (e);
   (i) routing the upper organic phase from the separating (d) to an evaporation step to yield an organic residue and low boiling distillate;
   (j) separating the organic residue from the evaporation (i) into a sulfur-comprising silane and a solid residue; and
   (k) optionally, recycling the solid residue from the separating (j) to the separating (d),
   wherein the brine is a saturated aqueous solution of left over reagents from the preparing (a), phase transfer catalyst and/or products from one or more previous reaction batches using the same method, and wherein no additional water is added during the process besides the water present in raw materials and water generated in reacting.

2. The process of claim 1, wherein the one or more sulfur-comprising silanes comprise a polysulfansilane of formula (I):

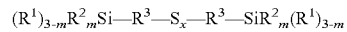

wherein $R^1$ are independently C1-C10-alkoxygroups, phenoxygroups or alkylpolyethergroups —O—(R'—O)$_r$R" with R' being independently a branched or unbranched, saturated or unsaturated, aliphatic, aromatic or mixed aliphatic/aromatic divalent C1-C30 hydrocarbon groups, r being an integer in a range of from 1 to 30, and R" independently being an unsubstituted or substituted, branched or unbranched monovalent alkyl group, alkenyl group, aryl group, or aralkyl group, $R^2$ are independently C6-C20-aryl groups, C1-C10-alkyl groups, C2-C20-alkenyl groups, C7-C20-aralkyl groups, or halogens, R3 are independently a branched or unbranched, saturated or unsaturated, aliphatic, aromatic or mixed aliphatic/aromatic divalent C1-C30-hydrocarbon group, and m are independently 0, 1, 2, or 3, and x is in a range of from 2 to 10.

3. The process of claim 1, wherein the phase transfer catalyst is a tetraalkylammonium halogenide of formula (II):

$$[(\text{Alk})_4\text{N}]^+\text{Hal}^- \qquad (\text{II}),$$

where

Alk is independently a $C_2$ to $C_{10}$ hydrocarbon, and $\text{Hal}^-$ is chloride, iodide, or bromide.

4. The process of claim 1, wherein the phase transfer catalyst is tetrabutylammonium bromide.

5. The process of claim 1, wherein, in the separating (d), before or during phase separation, an additional amount of the brine from the recycling (f) is added to a phase separator for the phase separation.

6. The process of claim 1, wherein, in the separating (d), before or during phase separation, the aqueous suspension from the recycling (h) is added.

7. The process of claim 1, wherein, in the separating (d), before or during or after phase separation, the solid residue from the recycling (k) is added.

8. The process of claim 1, wherein, in the recycling (f),
  5 to 100 wt. % of the brine is recycled into the preparing (a), and
  0 to 95 wt. % of the brine is recycled into the separating (d).

9. The process of claim 1, wherein, in the recycling (h),
  0 to 100 wt. % of the aqueous suspension is recycled into the preparing (a),
  0 to 100 wt. % of the aqueous suspension is recycled into the separating (d), and
  0 to 100 wt. % of the aqueous suspension is recycled into the separating (e).

10. The process of claim 1, wherein the process is conducted batchwise.

11. The process of claim 1, wherein the brine from the recycling (f) is added in the preparing (a) and/or the separating (d) from any previous batch.

12. The process of claim 10, wherein the aqueous suspension of the recycling (h) is added in the preparing (a) and/or the separating (d) and/or the separating (e) from any previous batch.

13. The process of claim 10, wherein the solid residue from the recycling (k) is added in the separating (d) from any previous batch.

14. The process of claim 10, wherein the recycling of the brine from the recycling (f) and/or the aqueous suspension of the recycling (h) and/or the solid residue of the recycling (k) are feed into any successive batch.

15. The process of claim 1, wherein, in the separating (e) before or during separation, the aqueous suspension from the recycling (h) is added.

16. The process of claim 1, wherein, in the recycling (f),
  10 to 50 wt. %, of the brine is recycled into the preparing (a), and
  10 to 50 wt. %, of the brine is recycled into adding (d).

17. The process of claim 1, wherein the separating (d) comprises centrifugation.

* * * * *